United States Patent [19]

Whinnery

[11] 4,265,221
[45] May 5, 1981

[54] SOLAR ENERGY COLLECTOR ASSEMBLY AND METHOD AND APPARATUS FOR CONTROLLING THE FLOW OF A TRANSFER MEDIUM

[75] Inventor: Lewis A. Whinnery, Huntsville, Ala.

[73] Assignee: Kendon Concepts, Excelsior, Minn.

[21] Appl. No.: 23,843

[22] Filed: Mar. 26, 1979

Related U.S. Application Data

[63] Continuation-in-part of Ser. No. 914,572, Jun. 9, 1978, abandoned.

[51] Int. Cl.³ .................................................. F24J 3/02
[52] U.S. Cl. ..................................... 126/422; 126/432; 126/444; 126/450; 126/452; 126/429
[58] Field of Search ............... 126/270, 271, 422, 428, 126/429, 431, 444, 445, 446, 449, 450, 452, 432; 165/169, 170, 171, 133, 28; 236/49, 47, 8, 6, 1 E, 1 B, DIG. 9

[56] References Cited

U.S. PATENT DOCUMENTS

| | | | |
|---|---|---|---|
| 1,925,822 | 9/1933 | Shurtleff | 236/1 R |
| 3,961,619 | 6/1976 | Estes et al. | 126/271 |
| 4,019,797 | 5/1978 | George | 126/270 |
| 4,033,324 | 7/1977 | Eckels . | |
| 4,043,317 | 8/1977 | Scharfman . | |
| 4,046,133 | 9/1977 | Cook . | |
| 4,051,832 | 10/1977 | Stelzer . | |
| 4,054,125 | 10/1977 | Eckels . | |
| 4,054,246 | 10/1977 | Johnson . | |
| 4,058,111 | 11/1977 | Wendel | 126/450 |
| 4,059,226 | 11/1977 | Atkinson . | |
| 4,067,316 | 1/1978 | Brin et al. . | |
| 4,068,652 | 1/1978 | Worthington . | |
| 4,069,809 | 1/1978 | Strand . | |
| 4,071,016 | 1/1978 | Henderson . | |
| 4,099,513 | 7/1978 | Skrivseth | 126/270 |
| 4,141,338 | 2/1979 | Lof | 126/270 |
| 4,144,871 | 3/1979 | Porter | 126/270 |
| 4,144,872 | 3/1979 | Harrison | 126/270 |
| 4,151,829 | 5/1979 | Wilson | 126/438 |
| 4,154,222 | 5/1979 | Yu | 165/170 |

Primary Examiner—James C. Yeung
Assistant Examiner—Larry Jones
Attorney, Agent, or Firm—Merchant, Gould, Smith, Edell, Welter & Schmidt

[57] ABSTRACT

A solar energy collector assembly is disclosed. The collector assembly includes an outer enclosure which has a light transparent major face adapted to face a light source and a plurality of walls extending rearwardly from the major face. A single collector plate is secured in the enclosure spaced from and rearward of the major face. The collector plate has a curvilinear configuration with a large radius of curvature. The collector plate has an outer surface adapted to face a light source and an opposite inner surface. A rear panel assembly which has an inner and an outer surface is attached in the enclosure rearward of the collector plate. A heating chamber is formed between the inner surface of the rear panel assembly and the inner surface of the collector plate. An inlet and an outlet communicate with the heating chamber to pass a transfer medium through the heating chamber. A control device is provided for controlling the rate at which a transfer medium is passed through the heating chamber.

42 Claims, 10 Drawing Figures

SOLAR ENERGY COLLECTOR ASSEMBLY AND METHOD AND APPARATUS FOR CONTROLLING THE FLOW OF A TRANSFER MEDIUM

CROSS-REFERENCE TO CO-PENDING APPLICATION

This is a continuation-in-part application of the co-pending application Ser. No. 914,572 on a SOLAR ENERGY COLLECTOR ASSEMBLY, filed on June 9, 1978, now abandoned.

BACKGROUND OF THE INVENTION

The present invention relates broadly to the use of solar energy for heating a building, such as a home. More specifically, the present invention relates to a solar collector assembly for absorbing solar energy and transferring the absorbed energy as heat to the interior of building.

Numerous types of solar collectors are currently on the market. Solar collectors generally utilize a collector plate or collector medium which absorbs solar energy. Thereafter some transfer medium, generally a fluid, passes by or in close proximity to the collector plate or collector medium to transfer energy in the form of heat away from the collector plate or collector medium. The transfer medium either passes the heat energy directly into the air of a building or to a storage medium.

One method of classifying solar collectors is according to the type of transfer medium used. One type of solar collector utilizes a liquid, such as water, as the transfer medium; and another type of solar collector utilizes a gas, generally air, as the transfer medium. When gas is utilized as the transfer medium, the air which has been heated by the solar collector can be passed either directly into the interior of a building to be heated or to a storage medium, such as rocks.

The following patents are illustrative of various prior art solar collectors.

U.S. Pat. No. 4,043,317 of Scharfman discloses a solar collector wherein fluid conduits are disposed above a flat collector plate and in heat conductive relation to the plate. The fluid conduits are adapted to generally carry water as the transfer medium.

U.S. Pat. No. 4,059,226 of Atkinson discloses a heat collector and storage chamber which is adapted to be mounted adjacent a wall of a building. The storage chamber holds a relatively large pile of rocks. A glass front wall permits sun rays to impinge upon and heat the rocks. Air, preferably from a conventional air furnace, passes through the rocks as the transfer medium.

U.S. Pat. No. 4,054,246 of Johnson discloses a building structure wherein the outer surface of the building is utilized as a solar collector. A plenum is formed behind the outer walls and a gas is blown through the plenum to transfer heat away from the walls. The air transfers the heat to subterranean gravel pits which serve as heat storage media. When heat is required within the building, heated air is passed from the gravel pits to the interior of the building.

U.S. Pat. No. 4,069,809 of Strand discloses solar heat collecting building blocks wherein the blocks themselves serve as solar collectors. Passageways are formed through the blocks so that air may be passed through the blocks to transfer the collected heat out of the blocks.

U.S. Pat. No. 4,046,133 of Cook discloses a solar panel assembly wherein a plurality of triangular-shaped fins form a collector plate. Air is blown directly across the top surface of the collector plate to transfer heat therefrom to the interior of a building.

U.S. Pat. No. 4,068,652 of Worthington discloses a solar collector which utilizes a generally flat plate collector. The solar collector is ullustrated as either a roof mount or wall mount collector. As a wall mount collector, the transfer medium is drawn directly into a room to be heated.

U.S. Pat. Nos. 4,033,324 and 4,054,125 of Eckels disclose the use of focusing elements above a collector to direct light thereto. In several embodiments, a curved collector plate having a small radius of curvature is disclosed. The curved collectors plates generally form a curtain-like structure.

U.S. Pat. Nos. 4,051,832; 4,067,316; and 4,071,016 also disclose solar energy collectors or panels.

SUMMARY OF THE INVENTION

The present invention relates to a solar energy collector assembly. The collector assembly includes an outer enclosure which has a light transparent major face adapted to face a light source and a plurality of walls extending rearwardly from the major face. A single collector plate is secured in the enclosure spaced from and rearward of the major face. The collector plate has a curvilinear configuration with a large radius of curvature. The collector plate has an outer surface adapted to face a light source and an opposite inner surface. A rear panel assembly which has an inner and an outer surface is attached in the enclosure rearward of the collector plate. A heating chamber is formed between the inner surface of the rear panel assembly and the inner surface of the collector plate. An inlet and an outlet communicate with the heating chamber to pass a transfer medium through the heating chamber.

In the preferred embodiment, the outer surface of the collector plte is embossed and coated or painted flat black. The embossing of the outer surface reduces the reflection of light from the collector plate and thus enhances the efficiency of the heat absorption by the collector plate. The inner surface of both the collector plate and the rear panel assembly are reflective. Electromagnetic heat energy which emanates from the inner surface of the collector plate thus reflects back and forth within the heating chamber. This reflection also enhances the efficiency of the collector assembly, since the reflection reduces the absorption and reabsorption of the heat energy into other parts of the collector assembly. The heat energy is thus readily available to a transfer medium passing through the heating chamber.

Turbulence deflectors are disposed within the heating chamber. The turbulence deflectors are aligned generally transverse to the path of a transfer medium through the heating chamber. Air, which is generally the transfer medium, therefore passes through the heating chamber in a turbulent manner. The turbulent passage of the air increases the scrubbing effect of the air across the surface of the collector plate and thus increases the heat transfer from the collector plate to the moving air.

Also in the preferred embodiment, the outer enclosure is made of a single piece of plastic material and insulative materials are interposed between the outer enclosure and the collector plate.

Various advantages and features of novelty which characterize the invention are pointed out with particularity in the claims annexed hereto and forming a part hereof. However, for a better understanding of the invention, its advantages, and objects attained by its use, reference should be had to the drawings which form a further part hereof, and to the accompanying descriptive matter, in which there is illustrated and described preferred embodiments of the invention.

DETAILED DESCRIPTION OF THE INVENTION

Figures 1, 2, 3:
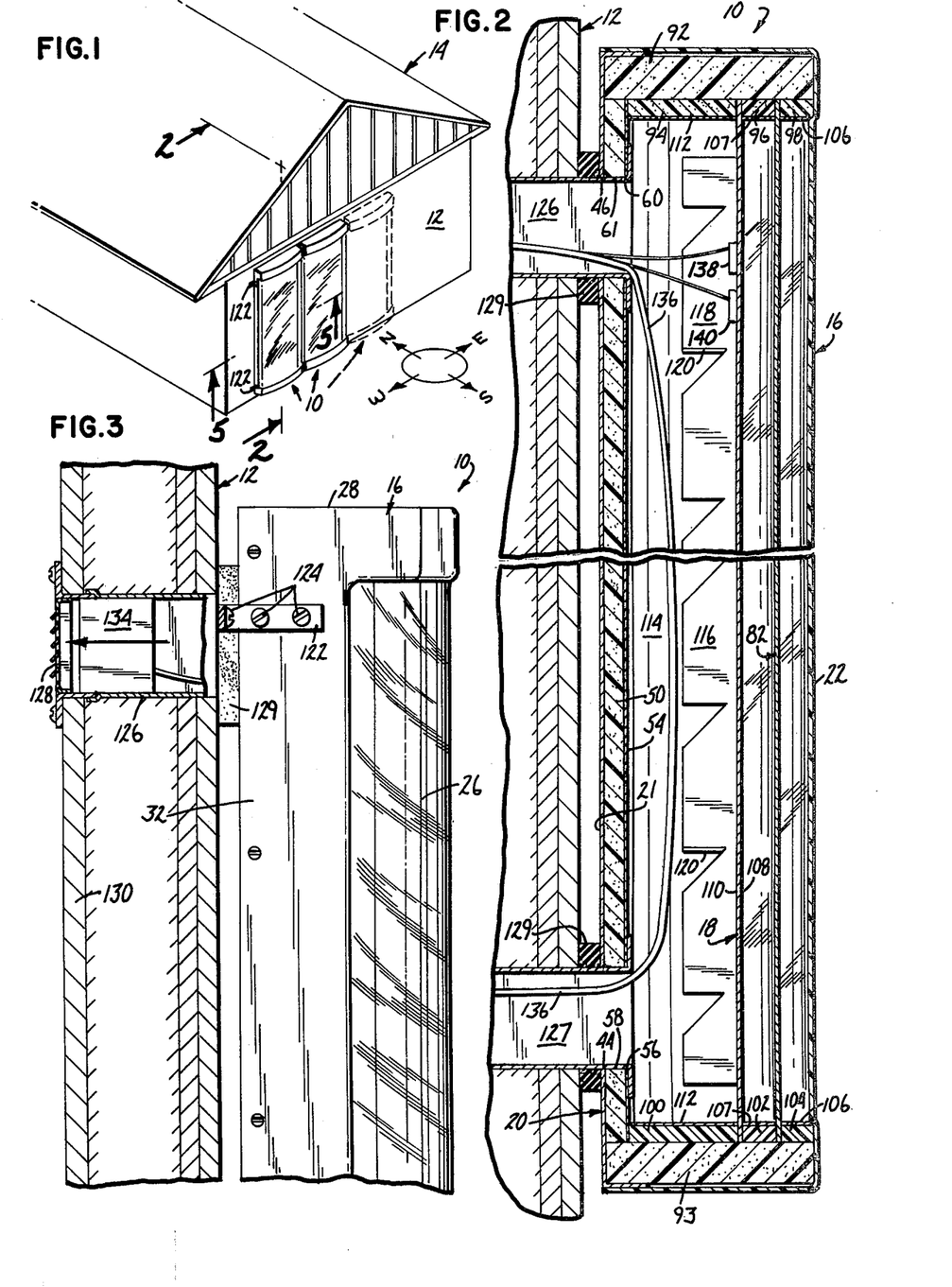
FIG. 1 is a perspective view illustrating a plurality of solar collectors made in accordance with the present invention mounted to a wall of a building.
FIG. 2 is a sectional view taken along line 2—2 of FIG. 1.
FIG. 3 is a partially side elevational and partially sectional view illustrating an air inlet into the interior of a building.

Referring to the drawings in detail, wherein like numerals indicate like elements, there is shown in FIG. 1 a plurality of solar collector assemblies in accordance with the present invention designated generally as 10. The solar collector assemblies 10 are shown mounted to a generally South-facing wall 12 of a building 14. The building 14 may be of any type, however, the solar collector assemblies 10 are especially suitable for use on residential homes.

The basic components of the solar collector assemblies 10 include an outer enclosure 16, a collector plate 18 and a rear panel assembly or wall 20. The outer enclosure 16 is made of a single piece of material, preferably a plastic material such as a butyrate cellulose plastic. The outer enclosure 16 has a major face 22, a pair of side walls 24, 26, a top wall 28, and a bottom wall 30. A major portion of the face 22 and portions of the side walls 24, 26 are light transparent. The entire top and bottom walls 28, 30 and trim portions 32 of the face 22 and side walls 24, 26 are painted for decorative purposes. The major face 22 is adapted to face a light source, i.e., sunlight.

Figure 4:
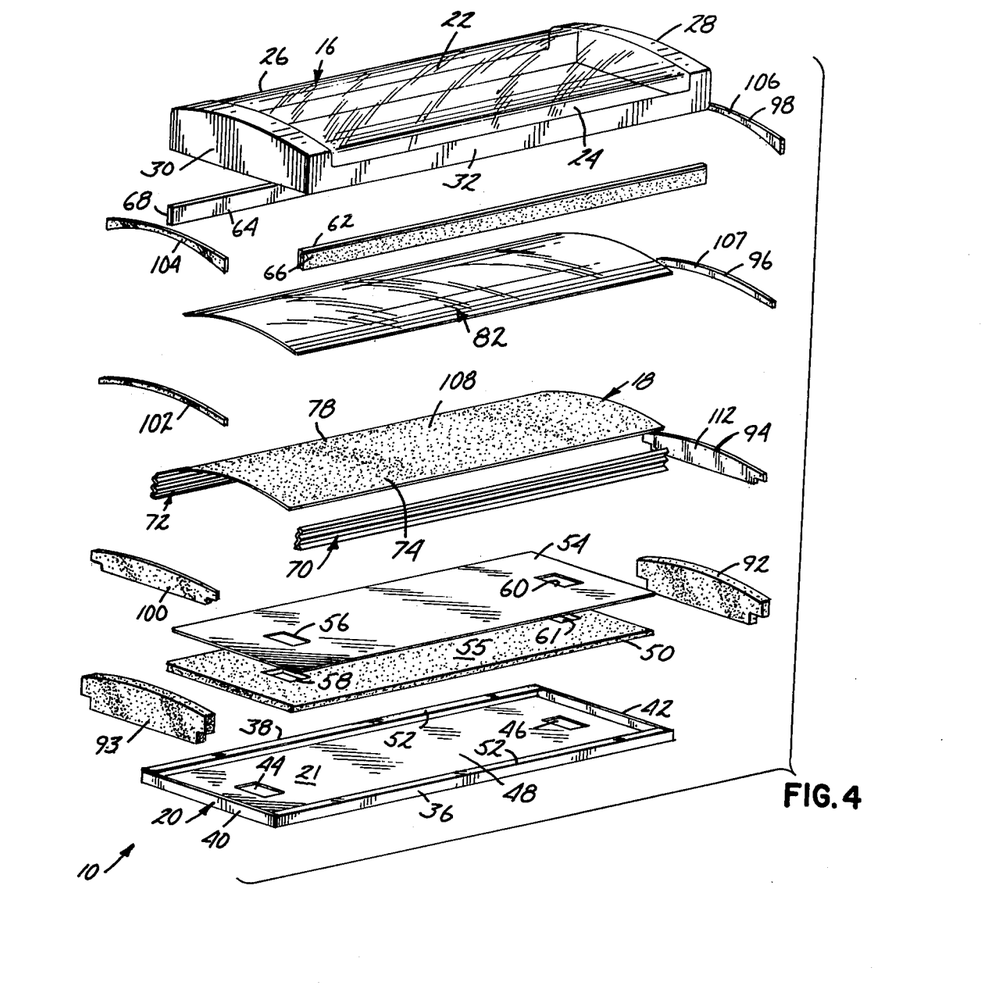
FIG. 4 is an exploded perspective view of the solar energy collector assembly.

The rear panel assembly 20 is comprised of a rear panel plate 21, a rear insulation panel 50 and a sheet of reflective material 54. The rear panel plate 21 is preferably made of a lightweight sheet metal material and has a plurality of upstanding walls or edges 36, 38, 40 and 42. An air inlet hole 44 and an air outlet hole 46 are formed through a face 48 of the rear panel plate 21. The rear insulation panel 50 is received on the inside of the face 48 between the walls 36–42. A flange 52 extends inwardly from each of the walls 36–42 to secure the rear insulation panel 50 in place. The sheet of reflective material 54 covers substantially the entire inner surface 55 of the insulation panel 50. The reflective material 54 and the insulation panel 50 each has an inlet hole 56, 58 in alignment with the air inlet hole 44 and air outlet holes 60, 61 in alignment with the air outlet hole 46.

Figures 5, 6, 7:
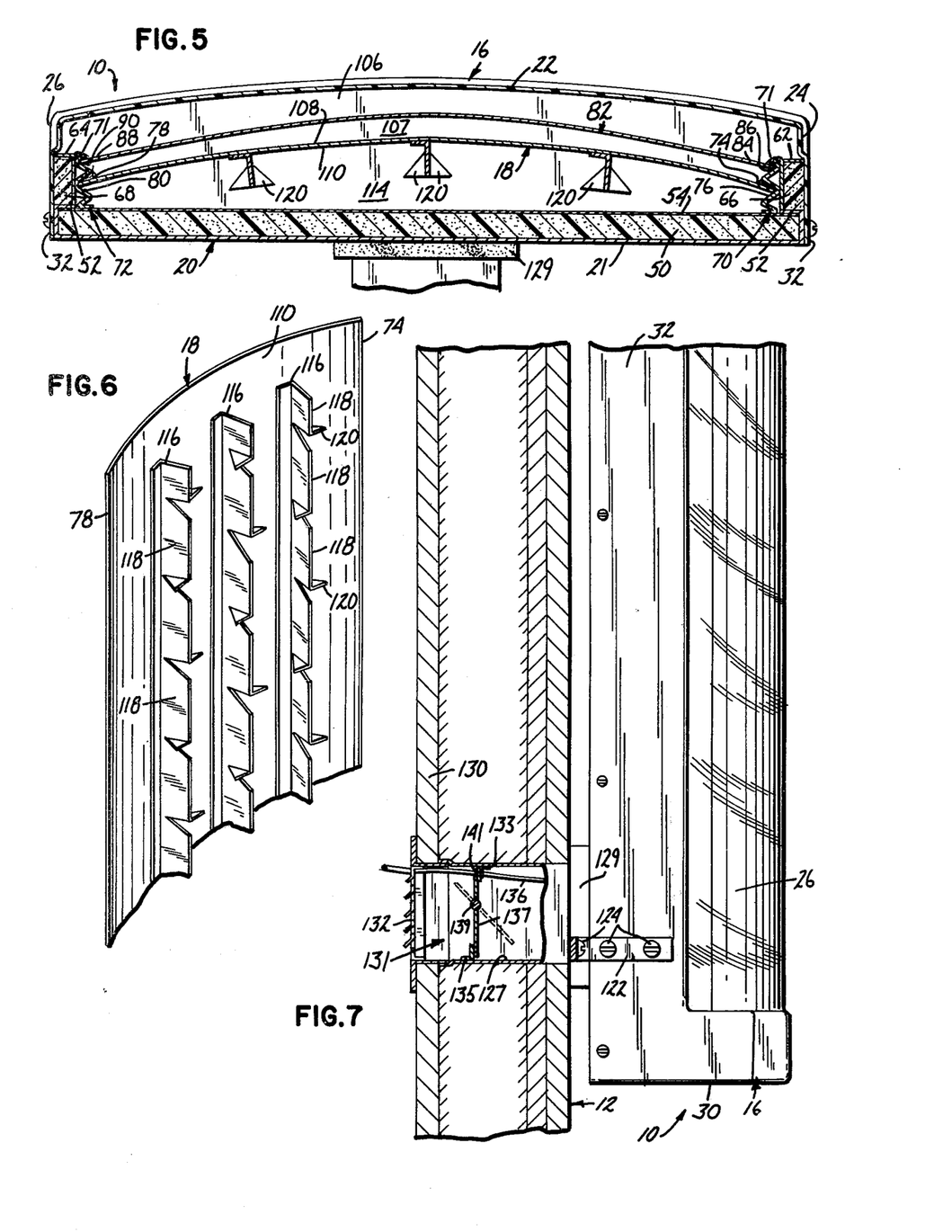
FIG. 5 is a sectional view taken along line 5—5 of FIG. 1.
FIG. 6 is a perspective view illustrating the rear of the collector plate.
FIG. 7 is a view similar to FIG. 3 illustrating an air outlet into the interior of a building.

A longitudinally extending structural beam 62 is supported above the rear panel assembly 20 adjacent the side wall 24 and a longitudinally extending structural beam 64 is supported above the rear panel assembly 20 adjacent the side wall 26. As seen in FIG. 5, the structural beams 62, 64 can take on a right-angled cross-sectional configuration. A strip of side insulation material 66 is received between the beam 62 and the side wall 24. A strip of side insulation material 68 is received between the beam 64 and the side wall 26. The strips of insulation material 66, 68 can be made of any suitable thermally insulative material, for example, styrofoam.

A longitudinally extending retainer strip 70 is supported on the rear panel assembly 20 next to the beam 62. A longitudinally extending retainer strip 72 is supported on the rear panel assembly 20 next to the beam 64. The retainer strips 70, 72 each have a generally zig-zag cross-sectional configuration. A longitudinal edge 74 of the collector plate 18 is received and retained within a valley 76 of the retainer strip 70. An opposite longitudinal edge 78 of the collector plate 18 is received and retained within a valley 80 of the retainer strip 72. A silicon adhesive 71 is preferably used to provide a thermal seal between the edges 74, 78 and the retainer strips 70, 72.

In the preferred embodiment, an inner glazing or fiberglass sheet 82 is also secured within the enclosure by the retainer strips 70, 72. A longitudinal edge 84 of the fiberglass sheet 82 is secured within a valley 86 of the retainer strip 70, and an opposite longitudinal edge 88 is secured within a valley 90 of the retainer strip 72. The silicon adhesive 71 is also used to secure the edges 84, 88 to the retainer strips 70, 72. The retainer strips 70, 72 are formed of a thermally insulative material and serve as a thermal barrier between the outer enclosure 16 and the collector plate 18 and the inner glazing 82. The inner glazing 82 is preferably made of a solar fiberglass material. The solar fiberglass material serves to transmit light through the inner glazing 82 to the collector plate 18 while at the same time preventing reflection of the light or heat outwardly from the collector plate 18 to the major face 22. The inner glazing 82 thus acts similar to a one-way mirror to prevent the loss of heat from the assembly 10.

A plurality of support or insulation blocks are disposed at the top and bottom ends of the assembly 10. A relatively thick top insulation blcok 92 is inserted between the top edges of the fiberglass sheet 82 and of the collector plate 18 and the top wall 28. Similarly, a relatively thick bottom insulation block 93 is inserted between the top edges of the fiberglass sheet 82 and of the collector 18 and the bottom wall 30. A spacer-insulation block 94 is contoured to fit between the rear panel 20 and the collector plate 18. A spacer-insulation block 96 is contoured to fit between the collector plate 18 and the fiberglass sheet 82. A spacer-insulation block 98 is contoured to fit between the fiberglass sheet 82 and the enclosure 16. The spacer-insulation blocks 94–98 are disposed at the top end of the assembly 10 below the insulation block 92. A similar set of spacer-insulation blocks 100, 102, 104 are disposed at the bottom end of the assembly 10 above the insulation block 93. The inner surface of the uppermost spacer-insulation blocks 98 and 104 is covered with a light-reflective material 106.

The inner surface of the central space-insulation blocks 96 and 102 is also covered with a light-reflective material 107. Light striking the light-reflective material 106, 107 may thus be reflected downwardly to the collector plate 18.

Figure 8:
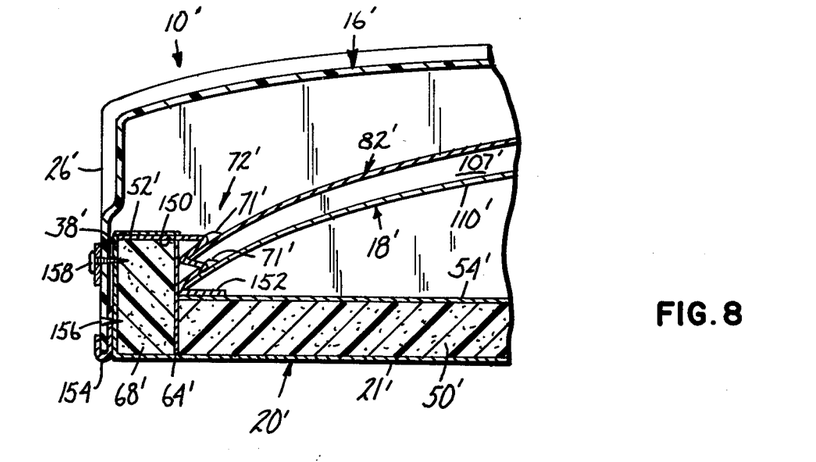
FIG. 8 is a partial sectional view similar to FIG. 5 illustrating an alternate embodiment of a thermal barrier.

There is illustrated at FIG. 8 an alternate embodiment of the retainer strip 72, together with associated altered parts. The retainer strip 70 and associated parts are similarly altered, however, for simplicity only one side of the alternate embodiment is shown in FIG. 8. Similar parts will be indicated by similar primed numbers, together with a description of their distinction from the first embodiment. The retainer 72' has an elongated top section 150 which extends above substantially the entire width of the top of the insulation material 68'. A bottom section 152 of the retainer strip 72' extends over the reflective surface 54' a longer distance than does the bottom section of the retainer strip 72. The structural beam 64' is formed as a single planar plate rather than the angled configuration of the structural beam 64. The insulation material 68' extends between the top section 150 and the rear panel plate 21'. The upstanding wall 38' of the rear panel assembly 20' extends upwardly along the insulation material 68' and the flange 52' of the rear panel assembly 20' extends inwardly above the top section 150.

A protective lip 154 is received about the lowermost edge of the side wall 26'. The protective lip 154 is secured to the upstanding wall 38' by any suitable fastening means, such as screws 156. The outer enclosure 16' is secured to the remainder of the assembly 10' by means of a plurality of screws and washers 158.

The collector plate 18 has an outer or light-facing surface 108 and an inner surface 110. The collector plate 18 has a curvilinear configuration in cross-section. The radius of curvature of the curvalinear section is relatively large. For example, in a typical assembly 10 which is approximately 30 inches in width, approximately 6 feet 8 inches in length, and approximately 7 inches in depth, the radius of curvature may be between 20-30 inches and preferably is 26 inches. The use of a curvilinear collector plate 18 with a large radius of curvature has an advantage over a flat collector plate in that throughout the day a larger surface area of the collector plate 18 receives a larger normal component of sunlight. If a flat collector plate were used, during the morning and evening hours a small normal component of sunlight would strike the reflector. By utilizing a slightly curved collector plate 18, a larger component of the light strikes the collector plate 18 at or near a normal angle during the morning and evening hours.

The collector plate 18 is made of a heat-conductive material such as aluminum. As is conventional with solar collector plates, the outer surface 108 of the collector plate 18 is coated or painted flat black. A flat black surface normally reflects little light, however, in order to reduce even more the reflectance of light from the surface 108, the surface 108 is embossed. In the preferred embodiment, standard embossed or milled sheet metal aluminum is used for the collector plate 18. To further enhance the embossing or roughness of the surface 108, the flat black paint which is applied to the surface 108 is sprayed on in such a manner that some of the paint solidifies into small particles prior to settling upon the surface 108. Such a spraying technique further enhances the embossing or roughening of the surface 108.

The inner surface 110 of the collector plate 18 is made of a reflective surface. A reflective material 112 is attached to the inner surface of the insulation blocks 94, 100. As was mentioned above, the sheet of reflective material 54 covers the rear insulation panel 50. A heating chamber 114 is thus bounded by the reflective surfaces 54, 112, and 110. Solar energy is absorbed by the collector plate 18 and converted into heat energy which raises the temperature of the collector 18 and can be emitted into the heating chamber 114 as electromagnetic heat energy. The reflective surfaces reflect the electromagnetic heat energy which is emitted from the inner surface 110 of the collector plate 18. The reflection of the heat energy within the cavity 114 enhances the efficiency of the collector panel assembly 10 by preventing the reabsorption or absorption of the heat into the other parts of the assembly 10. That is, the heat energy remains available within the chamber 114 for removal by a transfer medium.

A plurality of flanges or angle brackets 116 are secured to the inner surface 110 of the collector plate 18 and extend into the heating chamber 114. The flanges 116 each have first sections 118 which run generally parallel to the longitudinal dimension of the collector plate 18. Since the air flow through the heating chamber 114 is from the air inlet hole 44 to the air outlet hole 46, the air flows through the heating chamber generally in the longitudinal dimension of the collector plate 18. The first sections 118 of the flanges 116 are thus generally parallel to the direction of the air flow. The flanges 116 have a plurality of cut-out sections 120 which are bent away from the first sections 118 and are disposed generally transverse or perpendicular to the first sections 118. As is best seen in FIG. 6, successive cut-out sections 120 on a given flange 116 extend transversely from the first sections 118 in opposite directions. The cut-out sections 120 serve as turbulence deflectors to create turbulence in the air flowing through the chamber 114. The turbulence created by the cut-out sections 120 also enhances the efficiency of the assembly 10 by causing a greater scrubbing action against the collector plate 18 so that more heat is removed or drawn from the collector plate 18.

The solar energy collector assembly 10 is secured to the wall 12 by a plurality of angle brackets 122. The angle brackets 122 are secured to the side walls 24, 26 by a suitable means, such as screws 124. As best seen in FIGS. 2, 3 and 7, the angle brackets 122 are secured to the wall 12 in such a manner that the outer face of the rear panel 20 is spaced from the wall 12.

An air inlet duct 126 is received within the air inlet holes 44, 56, 58 and couples the heating chamber 114 with the interior of the building 14. An air outlet duct 127 passes through the air outlet holes 46, 54, 61 and couples the heating chamber 114 with the interior of the building 14. A resilient material 129 surrounds each of the ducts 126, 127. The resilient material 129 in its uncompressed state is wider than the space between the rear panel 20 and the wall 12. When the brackets 122 are tightened against the wall 12, the resilient material 129 compresses and forms an air tight seal around the ducts 126, 127. An air-deflecting grille 128 is secured to an inner wall 130 of the building 14 and communicates with the air outlet duct 127. An air-deflecting grille 132 is also connected to the inner wall 130 and communicates with the air inlet 126.

A blower means 134, such as a squirrel cage fan, is supported within the air outlet duct 127. The blower means 134 draws air from within the building 14 in through the air inlet duct 126, through the heating chamber 114 and returns the air to the interior of the building 14 through the air outlet duct 127. An electrical cord 136 from the blower means 134 is passed through the heating chamber 114 and the air inlet duct 126 to the interior of the building 14. Thus, the blower means 134 may be connected to a typical wall outlet.

A damper assembly 131 is supported within the air inlet duct 126. As is best seen in FIG. 7, the damper assembly 131 includes an upper bracket seal 133 and a lower bracket seal 135. A damper door 137 is pivotally supported in the inlet duct 126 by a pivot bar 139. The damper door 137 is shown in a closed or sealed position in full line and in an open position in dotted line. The damper door 137 has a larger surface area below the pivot bar 139 and is gravity-biased downwardly to a sealed position. When the blower means 134 is operative, only a slight pressure upon the lower surface of the damper door 137 will pivot the damper door 137 to its open position. The electrical cord 136 may be passed through a grommet 141 in the upper bracket seal 133.

Figure 9:
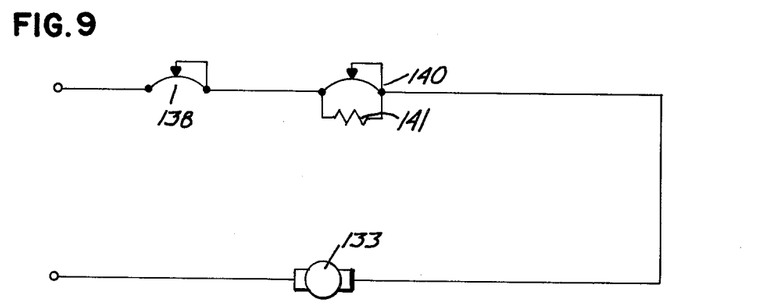
FIG. 9 is a schematic of one type of a transfer medium flow control mechanism.
Figure 10:
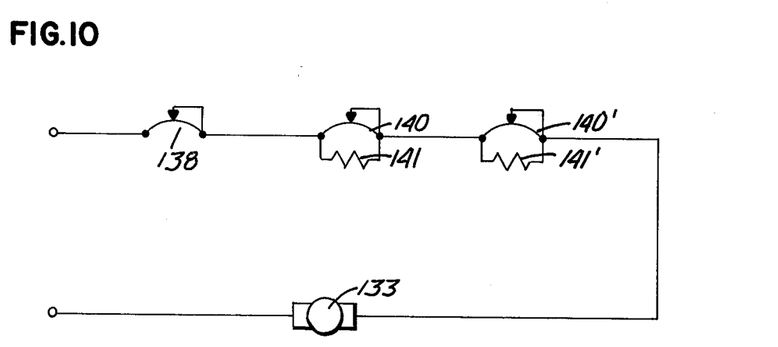
FIG. 10 is a schematic of variation of the transfer medium flow control mechanism shown in FIG. 9.

The solar energy collector assembly operates in the following manner. As sunlight strikes the collector plate 18, the temperature of the collector plate 18 is elevated. Electromagnetic heat energy is given off at the inner surface 110 of the collector plate 18 and is reflected within the heating chamber 114. The blower means 134 is driven by an electrical motor 133 and draws air through the heating chamber 114 to transfer the hot air from the heating chamber 114 and from the collector plate 18 to the interior of the building 14. A control means is provided for controlling the operation of the blower means 134. The control means is comprised of a pair of temperature-sensitive control sensors or switches 138, 140. The temperature-sensitive control switches 138 and 140 are mounted to the inner surface 110 of the collector plate 18. The first switch 138 turns the blower means 134 on when the collector plate 18 temperature reaches approximately 110° F., and thereafter shuts the blower means 134 off when the temperature of the collector plate 18 falls below approximately 90° F. The first switch 138 operates the blower means 134 through a transformer or resistor 141 at a reduced output. The second switch 140 overrides the first switch 138 when the temperature of the collector plate 18 reaches approximately 140° F., and continues to override the first switch 138 until the temperature of the collector plate 18 falls to approximately 120° F. While the second switch 140 overrides the first switch 138, the resistor 141 is shunted and power is supplied directly to the blower means 134 so that it operates at its normal total output. The connection between the temperature-sensitive switches 138, 140, the resistor 141 and the motor 133 is shown schematically in FIG. 9. FIG. 10 illustrates that additional temperature-sensitive switches 140' and resistors 141' can be added to the circuit to provide further incremental control. While only one additional pair of switches 140' and 141' are shown in FIG. 10, it should be understood that additional pairs of switches and resistors could be utilized to attain further incremental control. It has been found that a squirrel cage-type blower fan operable at a full output of 100 cubic feet per minute and a lower reduced output of 60 cubic feet per minute is desirable. In this manner, a substantially constant amount of heat is transferred into the interior of the building.

As shown in FIG. 1, the solar energy collector assemblies 10 are preferably installed on the vertical wall of a building. However, the solar energy collector assemblies of the present invention may also be mounted to a roof of a building. Also, while two solar collector assemblies 10 are shown in full line attached to the wall 12, it should be understood that any number, i.e., one or more, may be utilized. The number of assemblies 10 which are utilized will be dependent upon the size of the building to be heated and the amount by which the existing heating system is to be supplemented by the collector assemblies 10. While the control mechanism for the motor 133 has been shown controlling an air blower, it should be understood that the control mechanism can be used to control a pump motor where a liquid is used as the heat transfer media.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

What is claimed is:

1. A solar energy collector assembly comprising:
   an outer enclosure having a light transparent major face adapted to face a light source and a plurality of walls extending rearwardly from said major face;
   a single collector plate secured in said enclosure spaced from and rearward of said major face, said collector plate having a single curvilinear, outwardly facing, convex configuration with a large radius of curvature and an outer convex surface adapted to face a light source and an opposite inner surface, said collector plate extending over an area substantially equal to the area of said transparent major face of said outer enclosure;
   a rear panel assembly having an inner and an outer surface, said rear panel assembly being attached to said enclosure rearward of said collector plate to form an enclosed heating chamber between said inner surface of the rear panel assembly and said inner surface of the collector plate; and
   inlet and outlet means communicating with said heating chamber for passing a transfer medium through said heating chamber.

2. A solar energy collector assembly in accordance with claim 1 wherein said enclosure is formed of a single piece of material and said plurality of walls are formed integral with said major face.

3. A solar energy collector assembly in accordance with claim 2 wherein said plurality of walls include a pair of side walls extending along a lengthwise dimension of said enclosure, and a top wall and a bottom wall extending between said side walls.

4. A solar energy collector assembly in accordance with claim 3 wherein said single piece enclosure is formed of a plastic material.

5. A solar energy collector assembly in accordance with claim 1 including thermal barrier material disposed along a pair of opposing walls of said enclosure, a pair of opposing edges of said collector plate being secured to said thermal barrier material whereby said thermal barrier material thermally insulates said collector plate from said outer enclosure.

6. A solar energy collector assembly in accordance with claim 5 wherein said thermal barrier material is formed of thermally insulative material and has a cross-sectional configuration with at least one valley extending along a lengthwise dimension adjacent each of said opposing side edges, and the edges of said collector plate secured to said thermal barrier being received within said valleys.

7. A solar energy collector assembly in accordance with claim 1 wherein said outer surface of said collector plate is an embossed flat black surface, and wherein said inner surface of said rear panel assembly and said inner surface of said collector plate are reflective whereby heat collected by said collector plate is reflected within said heating chamber.

8. A solar energy collector assembly in accordance with claim 7 wherein said inlet means includes a fluid inlet hole through said rear panel assembly adjacent one longitudinal end thereof and said outlet means includes a fluid outlet hole through said rear panel assembly adjacent another longitudinal end thereof, said inlet hole and said outlet hole being in communication with said heating chamber and establishing a fluid flow path therethrough.

9. A solar energy collector assembly in accordance with claim 8 including a plurality of turbulence deflectors disposed generally transversely of said fluid flow path through said heating chamber.

10. A solar energy collector assembly in accordance with claim 9 wherein said turbulence deflectors include a plurality of flanges extending downwardly from the inner surface of said collector plate into said heating chamber, each flange having a first section generally parallel to said fluid flow path, and a plurality of cut-out sections extending from said first section generally transverse thereto.

11. A solar energy collector assembly in accordance with claim 1 including a light transparent inner panel secured inside said enclosure between the major face of said enclosure and the outer surface of said collector plate.

12. A solar energy collector assembly in accordance with claim 11 wherein said inner panel is formed of a translucent fiberglass material.

13. A solar energy collector assembly in accordance with claim 1 including an inlet duct in communication with said inlet means, an outlet duct in communication with said outlet means, blower means for moving said transfer medium through said inlet duct, said heating chamber and said outlet duct, and means for controlling said blower means in response to the temperature of said collector plate, said inlet and outlet ducts being adapted to be in communication with an interior of a building.

14. A solar energy collector assembly comprising:
a single-piece outer enclosure having a light transparent major face adapted to face a solar light source and a plurality of walls integral with said major face and extending rearwardly therefrom;
a single collector plate secured in said enclosure spaced from and rearward of said major face, said collector plate having a single curvilinear, outwardly facing, convex configuration with a large radius of curvature, an embossed outer convex surface adapted to face a light source and an opposite reflective inner surface;
a rear panel assembly having an inner reflective surface and an outer surface, said rear panel assembly being attached to said enclosure rearward of said collector plate to form a heating chamber between said reflective surface of the rear panel and said reflective inner surface of said collector plate; and
an air inlet hole through said rear panel assembly adjacent one longitudinal end thereof and an air outlet hole through said rear panel assembly adjacent another longitudinal end thereof, said inlet hole and said outlet hole being in communication with said heating chamber and establishing an air flow path therethrough.

15. A solar energy collector assembly in accordance with claim 14 wherein said single-piece outer enclosure is formed of a plastic material and said walls include a pair of side walls extending along a lengthwise dimension of said outer enclosure, and a top wall and a bottom wall extending between said side walls, and wherein said collector plate is formed of an embossed aluminum sheet and said outer surface of said embossed aluminum sheet is coated flat black.

16. A solar energy collector assembly in accordance with claim 15 wherein said collector assembly is substantially 30 inches wide and 6 feet 8 inches long, and said curvilinear configuration of said collector plate has a radius of curvature greater than 20 inches.

17. A solar energy collector assembly in accordance with claim 14 including thermal barrier material disposed along a pair of opposing longitudinal side walls of said enclosure, said thermal barrier material along each side wall being formed of a thermally insulative material and having a zig-zag cross-sectional configuration with at least two valleys extending along a lengthwise dimension thereof, one edge of a pair of opposing side edges said collector plate being secured within one valley of said thermal barrier material along each longitudinal side wall, and said collector assembly including an inner panel formed of a translucent fiberglass material and having opposing side edges secured to another valley of said thermal barrier material, said inner panel being disposed between the major face of said enclosure and the outer surface of said collector plate.

18. A solar energy collector assembly in accordance with claim 17 wherein said rear panel assembly includes a pair of opposing upstanding walls, each upstanding wall extending upwardly from the outer surface of said rear panel assembly adjacent the inner surface of one of said longitudinal side walls, a flange extending inwardly from each upstanding wall, a strip of insulative material extending longitudinally along each upstanding wall between the flange of said upstanding wall and the outer surface of said rear panel assembly, a top section of said thermal barrier material being disposed between the flange of said upstanding wall and a top surface of said strip of insulative material, and a plate being disposed between a side surface of said strip of insulative material and the valleys of said thermal barrier material.

19. A solar energy collector assembly in accordance with claim 17 including a plurality of flanges extending downwardly from the inner surface of said collector plate into said heating chamber, each flange having a first section generally parallel to said air flow path and a plurality of cut-out sections extending from said first section generally transverse thereto to form a plurality of turbulence deflectors.

20. A solar energy collector assembly in accordance with claim 14 wherein said rear panel assembly includes a rear panel plate having an inner and an outer surface, a rear insulation panel covering the inner surface of said rear panel plate and having an inner and an outer surface, and a sheet of reflective material covering the inner surface of said rear insulation panel and forming the reflective surface of said rear panel assembly.

21. A solar energy collector assembly in accordance with claim 14 including an inlet duct in communication with said inlet hole and adapted to communicate with the interior of a building, an outlet duct in communication with said outlet hole and adapted to be in communication with a building, a blower means mounted in one of said inlet and outlet ducts for drawing air in through said inlet duct, through said heating chamber and out said outlet duct, and control means for controlling said blower means, said control means including a first thermally-responsive switch operative in a first temperature range to turn on and off said blower means at a power less than the maximum power level of said blower means and a second thermally-responsive switch operative at a temperature above the range of said first thermally-responsive switch to operate said blower means at a higher power level than said first thermally-responsive switch.

22. A solar energy collector assembly comprising:
a single-piece plastic outer enclosure having a light transparent major face adapted to face a solar light source and a plurality of walls integral therewith and extending rearwardly from said major face, said walls including a pair of side walls extending along a lengthwise dimension of said enclosure, and a top wall and a bottom wall extending between said side walls;
a single collector plate secured in said enclosure spaced from and rearward of said major face, said collector plate having a curvilinear configuration with a radius of curvature of at least 20 inches and a flat black embossed outer surface adapted to face a light source and an opposite reflective inner surface;
a light transparent inner panel formed of a translucent fiberglass material secured inside said enclosure between said major face of the enclosure and said outer surface of the collector plate;
thermal barrier material disposed along each side wall of said enclosure, said thermal barrier material along each side wall being formed of a thermally insulative material and having a zig-zag cross-sectional configuration with two valleys extending along a lengthwise dimension thereof, and opposing side edges of said collector plate being secured in one valley of the thermal barrier material along opposing side walls and opposing side edges of said inner panel being secured in the other valley of the thermal barrier material along opposing side walls;
a rear panel assembly having an inner reflective surface and an outer surface, said rear panel assembly being attached to said enclosure rearward of said collector plate to form a heating chamber between said reflective inner surface of the rear panel assembly and said reflective inner surface of the collector plate;
an air inlet hole through said rear panel assembly adjacent one longitudinal end thereof and an air outlet hole through said rear panel assembly adjacent another longitudinal end thereof, said inlet hole and said outlet hole being in communication with said heating chamber and establishing an air flow path therethrough;
an air inlet duct in communication with said air inlet hole and being adapted to communicate with an interior of a building and an air outlet duct in communication with said air outlet hole and being adapted to be in communication with an interior of a building;
a blower fan disposed in one of said inlet and outlet ducts for drawing air from an interior of a building in through said air inlet duct, through said heating chamber, and out said air outlet duct into the interior of the building; and
temperature-responsive control means for controlling the operation of said blower fan so that said blower fan blows air at a plurality of rates dependent upon the temperature of said collector plate.

23. A solar energy collector assembly comprising:
an outer enclosure having a light transparent major face adapted to face a light source and a plurality of walls extending rearwardly from said major face;
a single collector plate secured in said enclousre spaced from and rearward of said major face, said collector plate having a single curvilinear, outwardly facing, convex configuration with a large radius of curvature and an outer convex surface adapted to face a light source and an opposite inner surface;
a rear panel assembly having an inner and an outer surface, said rear panel assembly being attached to said enclosure rearward of said collector plate to form a heating chamber between said inner surface of the rear panel assembly and said inner surface of the collector panel;
inlet and outlet means communicating with said heating chamber for passing a transfer medium through said heating chamber; and
thermal barrier material formed of thermally insulative material disposed along a pair of opposing walls of said enclosure, said thermal barrier having a zig-zag cross-sectional configuration with at least one valley extending along a lengthwise dimension thereof, and one edge of a pair of opposing edges of said collector plate being received within each of said valleys along one of said opposing walls whereby said thermal barrier material thermally insulates said collector plate from said outer enclosure.

24. A solar energy collector assembly comprising:
an outer enclosure having a light transparent major face adapted to face a light source and a plurality of walls extending rearwardly from said major face;
a single collector plate secured in said enclosure spaced from and rearward of said major face, said collector plate having a single curvilinear, outwardly facing, convex configuration with a large radius of curvature and an outer convex surface adapted to face a light source and an opposite inner surface;
a rear panel assembly having an inner and an outer surface, said rear panel assembly being attached to said enclosure rearward of said collector plate to form a heating chamber between said inner surface of the rear panel assembly and said inner surface of the collector panel;
inlet means adjacent one longitudinal end of said assembly and outlet means adjacent an opposite longitudinal end of said assembly, said inlet and outlet means communicating with said heating chamber for creating a fluid flow path through said heating chamber to a transfer medium therethrough; and a plurality of turbulence deflectors disposed generally transversely of said fluid flow path through said heating chamber, said turbulence deflectors including a plurality of flanges extending downwardly from the inner surface of said collector plate into said heating chamger, each flange having a first section generally parallel to said fluid flow path, and a plurality of cut-out sections extending from said first section generally transverse thereto.

25. A solar energy collector assembly comprising:
an outer enclosure having a light transparent major face adapted to face a light source and a plurality of walls extending rearwardly from said major face;
a single collector plate secured in said enclosure spaced from and rearward of said major face, said collector plate having a single curvilinear, outwardly facing, convex configuration with a large radius of curvature and an outer convex surface adapted to face a light source and an opposite inner surface;
a rear panel assembly having an inner and an outer surface, said rear panel assembly being attached to said enclosure rearward of said collector plate to form a heating chamber between said inner surface of the rear panel assembly and said inner surface of the collector plate;
inlet and outlet means communicating with said heating chamber for passing a transfer medium through said heating chamber; and
thermal barrier insulative material having a cross-sectional configuration with at least one valley extending along a lengthwise dimension, said thermally insulative material being disposed along a pair of opposing walls of said enclosure, a pair of opposing edges of said collector plate being secured to said thermal insulative material by having each of said opposing edges received within one of said valleys whereby said thermal insulative material thermally insulates said collector plate from said outer enclosure.

26. A solar energy collector assembly comprising:
an outer enclosure having a light transparent major face adapted to face a light source and a plurality of walls extending rearwardly from said major face;
a single collector plate secured in said enclosure spaced from and rearward of said major face, said collector plate having a single curvilinear, outwardly facing, convex configuration with a large radius of curvature and an outer convex surface adapted to face a light source and an opposite inner reflective surface, said outer convex surface being an embossed flat black surface;
a rear panel assembly having an inner reflective surface and an outer surface, said rear panel assembly being attached to said enclosure rearward of said collector plate to form a heating chamber between said inner reflective surface of the rear panel assembly and said inner reflective surface of the collector plate whereby heat collected by said collector plate is reflected within said heating chamber; and
inlet means including a fluid inlet hole through said rear panel assembly adjacent one longitudinal end thereof and outlet means including a fluid outlet hole through said rear panel assembly adjacent another longitudinal end thereof, said inlet hole and said outlet hole being in communication with said heating chamber and establishing a fluid flow path therethrough for passing a transfer medium through said heating chamber.

27. A control device for controlling the flow of a fluid transfer medium through a solar panel comprising:
means for moving a fluid transfer medium through a solar panel;
a plurality of temperature sensitive switch means in heat sensing communication with a portion of the solar panel for sensing the temperature in the portion of the solar panel and operatively connected to said moving means for controlling the moving means and the flow of the fluid transfer medium through the panel;
each of said temperature sensitive switch means being responsive in a different temperature range for controlling said moving means to vary the rate at which the transfer medium is moved through the solar panel by said moving means at progressively higher rates as switch means responsive in higher temperature ranges are activated by heat energy in the portion of the solar panel sensed by said switch means.

28. A control device in accordance with claim 27 wherein a first of said switch means turns on and off at a lower temperature than the remaining switch means to connect the said moving means to a source of electrical power, and the remaining switch means turn on at progressively higher temperatures and progressively increase the electrical power supplied to said moving means.

29. A control device in accordance with claim 28 wherein each of the remaining switch means includes a resistor and a temperature sensitive shunting switch connected parallel thereto, said resistors being connected in series between said first switch means and the transfer medium moving means to provide a current flow path therebetween, said shunting switches having progressively higher turn-on temperature levels whereby as the temperature of said solar panel increases additional shunting switches turn on to progressively shunt additional resistors out of said current flow path.

30. A control device for controlling the flow of a fluid transfer medium through a solar panel comprising:
means for moving a fluid transfer medium through said solar panel;
a plurality of temperature sensitive switch means, each being in heat-conductive communication with an absorber plate of the solar panel for sensing the temperature of the absorber plate and being operatively connected to said moving means for controlling said moving means and the flow of a fluid transfer medium through the solar panel caused thereby;
each switch means being responsive in a different temperature range;
said plurality of switch means being connected to said means for moving the transfer medium through the solar panel at progressively faster rates as the switch means responsive in higher temperature ranges are activated by the heat energy of the absorber plate.

31. A control device for controlling the flow of a fluid transfer medium through a solar panel comprising:
electric motor means for moving a transfer medium through a solar panel;
a first temperature sensitive switch in heat sensing communication with a portion of the solar panel, said first switch having a turn-off temperature level at a first temperature for turning on electrical power to said motor means at said first temperature;

electrical power reduction means connected in series between said first switch and said motor means;

a second temperature-sensitive switch in heat sensing communication with a portion of the solar panel and connected parallel to said electrical power reduction means, said second temperature sensitive switch having a turn-on temperature level at a second temperature higher than said first temperature whereby when only said first switch is on current is supplied to said motor means through said power reduction means at a reduced power level and when both said first and second switches are on said power reduction means is shunted and current is supplied directly to said motor means through said first and second switches at a higher power level.

32. A control device in accordance with claim 31 wherein said power reduction means is comprised of a resistor.

33. A control device in accordance with claim 32 wherein said power reduction means includes a plurality of discrete resistors connected in series between said first switch and said motor means, and an individual shunting temperature sensitive switch being connected in parallel to each of said resistors for shunting a resistor from a current flow path to said motor when an associated shunting switch is turned on, said shunting switches having progressively higher turn-on temperature levels whereby as the temperature of a solar panel increases a progressively larger number of said resistors are shunted from the current flow path to said motor means to increase the power supplied to said motor means and thereby increase the rate at which the transfer medium is moved through said solar panel.

34. A control device in accordance with claim 31 wherein said motor means includes a blower fan for moving a gas through said solar panel as a transfer medium.

35. A control device in accordance with claim 31 wherein said motor means includes a pump for moving a liquid through said solar panel as a transfer medium.

36. A method for controlling the flow of a fluid transfer medium through a solar panel assembly comprising the steps of:
   (a) measuring the temperature at a reference area in a solar panel assembly with a plurality of switch means;
   (b) starting the flow of a fluid transfer medium through the solar panel assembly by the activation of a first of said switch means at a first fluid flow rate when the temperature measured in step (a) reaches a first value; and
   (c) increasing the fluid flow rate through the solar panel assembly by the activation of successive one of said switch means to a second fluid flow rate which is higher than said first fluid flow rate when the temperature measured in step (a) reaches a second value which is higher than said first value.

37. A method in accordance with claim 31 including the step of:
   (d) decreasing the fluid flow rate through the solar panel assembly from said second rate to said first rate when the temperature measured in step (a) falls to a third value which is below said second value.

38. A method in accordance with claim 32 including the step of:
   (e) stopping the flow of said fluid transfer medium through the solar panel assembly when the temperature measured in step (a) falls to a fourth value which is below said first value.

39. A method in accordance with claim 38 wherein said first value is approximately 110° F., said second value is approximately 140° F., said third value is approximately 120° F., and said fourth value is approximately 90° F.

40. A method in accordance with claim 38 wherein step (c) includes increasing the fluid flow rate through the solar panel assembly to a third fluid flow rate which is higher than said second fluid flow rate when the temperature measured in step (a) increases to a fifth value which is higher than said second value, and wherein step (d) includes decreasing the fluid flow rate through the solar panel assembly from said third rate to said second rate when the temperature measured in step (a) falls to a sixth value which is between said second value and said fifth value.

41. A method in accordance with claim 38 wherein step (c) includes incrementally increasing the fluid flow rate through the solar panel assembly to an Nth fluid flow rate which is higher than a preceding N-1 fluid flow rate when the temperature measured in step (a) increases to an Nth value which is higher than a preceding N-1 value, and wherein step (d) includes decreasing the fluid flow rate through the solar panel assembly from said Nth fluid flow rate to said N-1 fluid flow rate when the temperature measured in step (a) falls to a value below said Nth value.

42. A method in accordance with claim 32 wherein the plurality of switch means of step (a) is comprised of a plurality of temperature sensitive switches in a position for measuring the temperature of a solar collector of said solar panel assembly.

* * * * *